United States Patent
Nakamoto

(10) Patent No.: US 10,350,720 B2
(45) Date of Patent: Jul. 16, 2019

(54) ELECTRIC WORKING MACHINE

(71) Applicant: MAKITA CORPORATION, Anjo-shi, Aichi (JP)

(72) Inventor: Akihiro Nakamoto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 317 days.

(21) Appl. No.: 15/478,691

(22) Filed: Apr. 4, 2017

(65) Prior Publication Data

US 2017/0304976 A1    Oct. 26, 2017

(30) Foreign Application Priority Data

Apr. 20, 2016    (JP) ................................. 2016-084683

(51) Int. Cl.
| | |
|---|---|
| *H02P 3/06* | (2006.01) |
| *B24B 23/00* | (2006.01) |
| *B23Q 11/00* | (2006.01) |
| *B24B 23/02* | (2006.01) |
| *B25F 5/00* | (2006.01) |
| *H02P 29/024* | (2016.01) |
| *H02P 3/18* | (2006.01) |
| *H02P 7/295* | (2016.01) |
| *H02P 25/14* | (2006.01) |

(Continued)

(52) U.S. Cl.
CPC ...... *B23Q 11/0089* (2013.01); *B23Q 11/0085* (2013.01); *B23Q 11/0092* (2013.01); *B24B 23/028* (2013.01); *B25F 5/00* (2013.01); *H02P 3/06* (2013.01); *H02P 3/18* (2013.01); *H02P 7/295* (2013.01); *H02P 25/14* (2013.01); *H02P 29/024* (2013.01); *H02P 29/0241* (2016.02); *H02P 3/12* (2013.01); *H02P 27/04* (2013.01)

(58) Field of Classification Search
CPC ...... H02P 3/00; H02P 3/06; H02P 3/12; H02P 3/18; H02P 3/22; H02P 7/638; H02P 25/10; H02P 27/04; H02P 27/06; B24B 23/00; B24B 23/028; B23Q 11/00; B23Q 11/0089; B23Q 11/0092; B25F 5/00
USPC ........ 173/1, 2, 176, 217; 318/246, 244, 245, 318/250, 258, 362, 380, 381, 762, 566, 318/575
See application file for complete search history.

(56) References Cited

U.S. PATENT DOCUMENTS

| | | | | |
|---|---|---|---|---|
| 3,794,898 A | * | 2/1974 | Gross ........................ | H02P 3/22 318/258 |
| 3,800,202 A | * | 3/1974 | Oswald ..................... | H02P 3/12 318/368 |

(Continued)

FOREIGN PATENT DOCUMENTS

JP          5777924 B2    9/2015

*Primary Examiner* — Scott A Smith
(74) *Attorney, Agent, or Firm* — Oliff PLC

(57) ABSTRACT

An electric working machine comprises a motor, a switch, a drive device, a brake device, and a failure determiner. The switch is configured for operation by a user, has an on-state and an off-state. The drive device is configured to drive the motor in response to the switch being placed in the on-state. The brake device is configured to control deceleration of the motor to a stopped state in response to the switch being placed in the off-state. The failure determiner is configured to monitor deceleration of the motor during controlled deceleration and to determine whether the brake device has failed based on the monitored deceleration.

20 Claims, 5 Drawing Sheets

(51) Int. Cl.
*H02P 3/12* (2006.01)
*H02P 27/04* (2016.01)

(56) References Cited

U.S. PATENT DOCUMENTS

| | | | | |
|---|---|---|---|---|
| 3,949,622 A * | 4/1976 | Czabanski | ............. | H02P 29/40 74/409 |
| 3,965,404 A * | 6/1976 | Petersen | ................... | H02P 3/06 318/261 |
| 4,446,408 A * | 5/1984 | Ebermann | .......... | G05B 19/4065 318/565 |
| 5,132,598 A * | 7/1992 | Albanesius | ............... | H02P 3/12 318/285 |
| 5,334,919 A * | 8/1994 | Willard | .................... | H02P 3/12 318/375 |
| 5,705,903 A * | 1/1998 | Hastings | ................... | H02P 3/24 318/370 |
| 5,814,956 A * | 9/1998 | Kono | ................. | G05B 19/4063 318/380 |
| 6,114,826 A * | 9/2000 | Nishiura | ................... | H02P 8/22 318/254.2 |
| 6,291,951 B1 * | 9/2001 | Baulier | ..................... | H02P 3/04 318/362 |
| 6,525,495 B2 * | 2/2003 | Bianchi | .................... | H02P 3/06 318/245 |
| 7,170,245 B2 * | 1/2007 | Youm | ............... | H02M 7/53875 318/268 |
| 8,019,460 B2 * | 9/2011 | Akaiwa | ............... | G05B 19/4097 318/563 |
| 8,698,442 B2 * | 4/2014 | Okita | ........................ | H02P 5/74 318/566 |
| 8,766,569 B2 * | 7/2014 | Suda | ........................ | H02P 3/06 318/244 |
| 8,823,306 B2 * | 9/2014 | Masuda | ................... | H02P 3/02 318/299 |
| 9,242,566 B2 * | 1/2016 | Harada | .................... | H02P 9/48 |
| 2008/0203734 A1 * | 8/2008 | Grimes | .................... | E21B 3/02 290/40 R |
| 2009/0267544 A1 * | 10/2009 | Lee | ............................ | B60L 7/00 318/380 |
| 2012/0256570 A1 * | 10/2012 | Suda | ....................... | H02P 25/14 318/246 |
| 2013/0221888 A1 * | 8/2013 | Horikoshi | ............... | H02P 27/06 318/400.29 |
| 2013/0271083 A1 * | 10/2013 | Williams | .................. | H02J 3/28 320/128 |
| 2016/0197573 A1 * | 7/2016 | Iwata | ...................... | H02P 27/04 318/400.26 |

\* cited by examiner

ELECTRIC WORKING MACHINE

CROSS-REFERENCE TO RELATED APPLICATION

This application claims the benefit of Japanese Patent Application No. 2016-084683 filed on Apr. 20, 2016 with the Japan Patent Office, the disclosure of which is incorporated herein by reference.

BACKGROUND

The present invention is related to an electric working machine having a brake function to generate braking force when the driving of a motor stops.

For example, an electric working machine, such as an electric power tool, is known, which comprises a brake function to supply braking current to a motor to immediately stop the motor when the power source driving the motor stops (Japanese Patent Publication No. 5777924, and the corresponding U.S. Pat. No. 8,766,569).

With this type of electric working machine, safety can be improved wherein a tool bit, such as a grinding stone or rotational blades, is inhibited from being continuously rotated by inertia when a user switches off an operation switch to stop the driving of the motor.

SUMMARY

As disclosed in, for example, JP 5777924, the above-described brake function can be achieved by a brake device including an electric circuit that supplies braking current to a motor to generate braking force and a brake that applies braking force directly to the rotational shaft of the motor. However, if the brake device fails, the desired braking force cannot be generated.

Moreover, for example, if the breaking force, generated when the driving of the motor is stopped, is large, a sudden brake is applied to the tool bit, which gives the user discomfort and may cause loosening of the tool bit. On the other hand, if the breaking force, generated when the driving of the motor is stopped, is small, the rotation of the tool bit cannot be quickly stopped, which prevents the brake function from being fully implemented.

According to one aspect of the present disclosure, an electric working machine is desirably configured to detect failure of a brake device that generates braking force when the driving of a motor is stopped and further to notify a user of the failure.

An electric working machine according to one aspect of the present disclosure comprises a motor, a switch, a drive device, a brake device, and a failure determiner.

The switch is configured for operation by a user, has an on-state and an off-state. The drive device is configured to drive the motor in response to the switch being placed in the on-state. The brake device is configured to control deceleration of the motor to a stopped state in response to the switch being placed in the off-state.

The failure determiner is configured to monitor deceleration of the motor during controlled deceleration and to determine whether the brake device has failed based on the monitored deceleration.

Accordingly, the electric working machine according to the present disclosure can detect failure of the brake device by the failure determiner and notify the user of the failure.

The failure determiner may be further configured to determine whether the brake device has failed based on whether the monitored deceleration falls outside a predetermined range of values.

The failure determiner may be further configured to notify the user whether the brake device has failed.

The failure determiner may be further configured to notify the user in the event the failure determiner determines that the brake device has failed.

Another aspect of the present disclosure provides an electric working machine comprising a motor, a drive device configured to drive the motor, a brake device configured to generate braking force to stop rotation of the motor when driving of the motor by the drive device is finished, and a failure determiner.

The failure determiner is configured to detect deceleration of the motor when the driving of the motor by the drive device is stopped and to determine whether the brake device has failed based on the deceleration.

Accordingly, the electric working machine according to the present disclosure can detect failure of the brake device by the failure determiner and notify the user of the failure.

"Driving of the motor by the drive device is finished" and "driving of the motor by the drive device is stopped" described herein may be to stop supplying driving current from the drive device to the motor.

The failure determiner may be configured to determine that the brake device has failed when the deceleration of the motor exceeds a specified maximum value and the motor is suddenly decelerated.

Moreover, the failure determiner may be configured to determine that the brake device has failed when the deceleration of the motor falls below a specified minimum value and the motor cannot be sufficiently braked.

Furthermore, the failure determiner may be configured to notify a user of failure of the brake device when the brake device is determined to have failed, or to disable the drive device so as not to drive the motor.

When the failure determiner detects failure of the brake device, if the drive device is immediately disabled so as not to drive the motor, the electric working machine cannot be operated for any work. Thus, the failure determiner may be configured to allow the drive device to drive the motor for a specific period of time when the brake device is determined to have failed, and then disable the drive device so as not to drive the motor when the specific period of time passes.

Moreover, the failure determiner may be configured to sample the number of revolutions of the motor at specific intervals and to detect the deceleration of the motor based on a difference between a most recent sampling result and a sampling result obtained a specified period of time before.

Accordingly, by suitably setting the interval (in other words, time difference) to obtain two sampling results used for detecting the deceleration of the motor, the deceleration corresponding to the braking force generated by the brake device can be detected without being influenced by the rotational variation. Therefore, in this case, failure of the brake device can be more accurately determined in accordance with the detected deceleration.

Further aspect of the present disclosure provides a method for operating an electric working machine having a motor and a switch configured for operation by a user, the switch having an on-state and an off-state. The method comprises driving the motor in response to the switch being placed in the on-state, controlling deceleration of the motor to a stopped state in response to the switch being placed in the off-state, monitoring deceleration of the motor during controlled deceleration, and determining whether the brake device has failed based on the monitored deceleration.

BRIEF DESCRIPTION OF THE DRAWINGS

The present invention will now be described by way of example with reference to the accompanying drawings, in which.

DETAILED DESCRIPTION OF THE PREFERRED EMBODIMENT

The following will describe an embodiment of the present disclosure with reference to the drawings.

Figure 1:
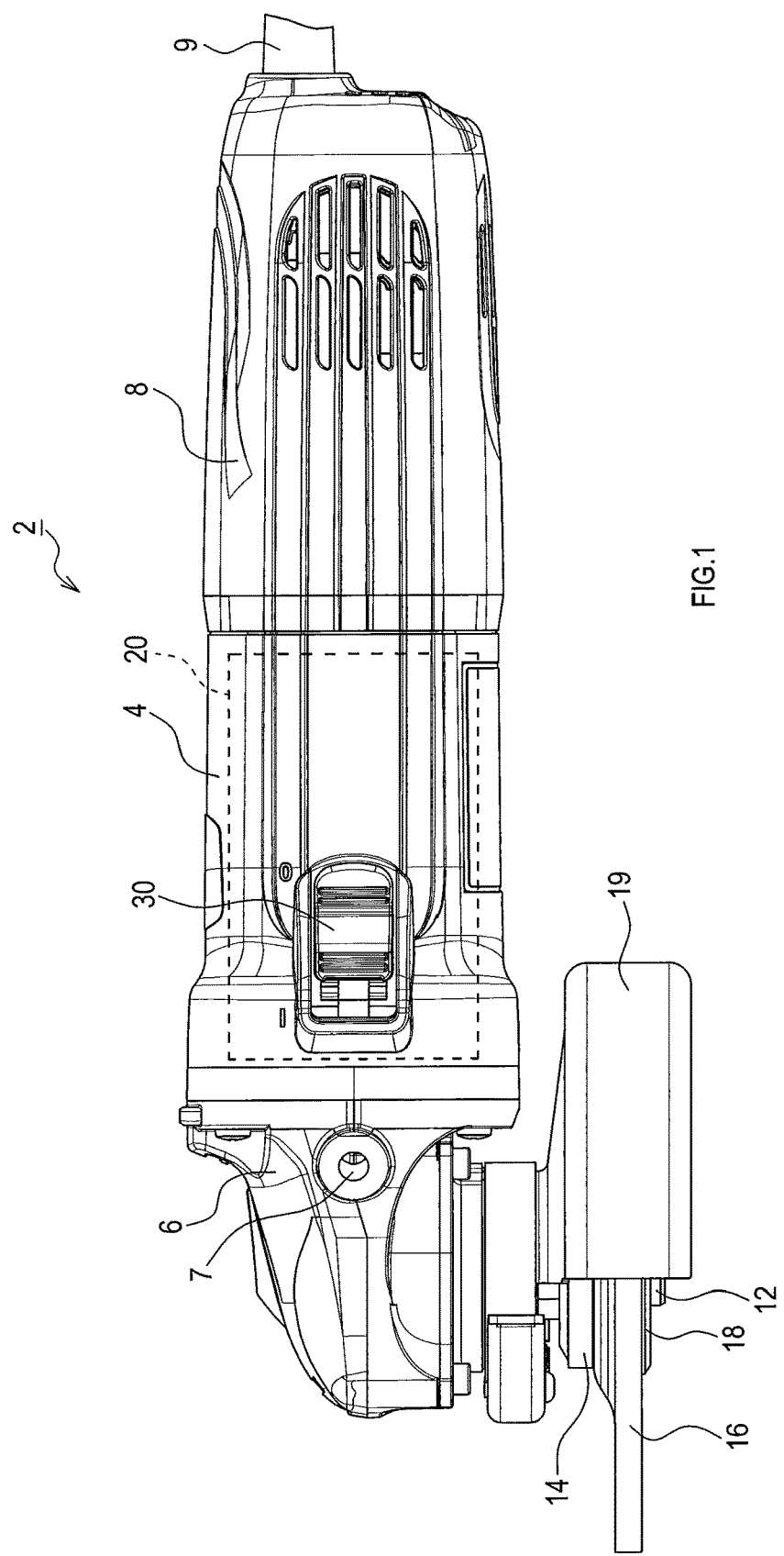
FIG. 1 is an external view showing the structure of an alternating-current driven type grinder according to an embodiment.

As shown in FIG. 1, a grinder 2 of the present embodiment mainly comprises a motor housing 4, a gear housing 6, and rear cover 8.

The motor housing 4 is approximately cylindrical in shape, and accommodates a motor 20. The motor 20 is housed in the motor housing 4 such that the rotational shaft of the motor 20 is disposed in parallel to the central axis of the motor housing 4. One end of the rotational shaft protrudes toward the gear housing 6.

The rotational shaft of the motor 20 is coupled with spindle 12, externally protruding from the gear housing 6, via a gear mechanism disposed in the gear housing 6.

The spindle 12 is rotatably disposed in the gear housing 6 such that the central shaft of the spindle 12 perpendicularly crosses the rotational shaft of the motor 20. The gear mechanism in the gear housing 6 is configured, for example, with a bevel gear so as to convert the rotation of the motor 20 into the rotation of the spindle 12. Since the gear mechanism is similarly configured to common grinders, the detailed description the gear mechanism is omitted here.

The spindle 12, protruding from the gear housing 6, is provided with an inner flange 14 for positioning and securing a circular plate-shaped tool bit 16. Toward the distal end of the spindle 12 further than the inner flange 14, a locknut 18 is threadedly engaged to hold the tool bit 16 between the locknut 18 and the inner flange 14.

Accordingly, disposing the tool bit 16 between the inner flange 14 and the locknut 18 and fastening the locknut 18 toward the inner flange 14 enables the tool bit 16 to be tightly secured. For the grinder 2 in the present embodiment, the tool bit 16 may be, for example, a grinding stone, a cutting-off wheel, or a wire brush.

Moreover, around the protruding portion of the spindle 12 in the gear housing 6, a wheel cover 19 is secured to protect a user from bits of a workpiece or the tool bit 16 scattering when, for example, grinding, polishing, or cutting is performed.

Figure 2:
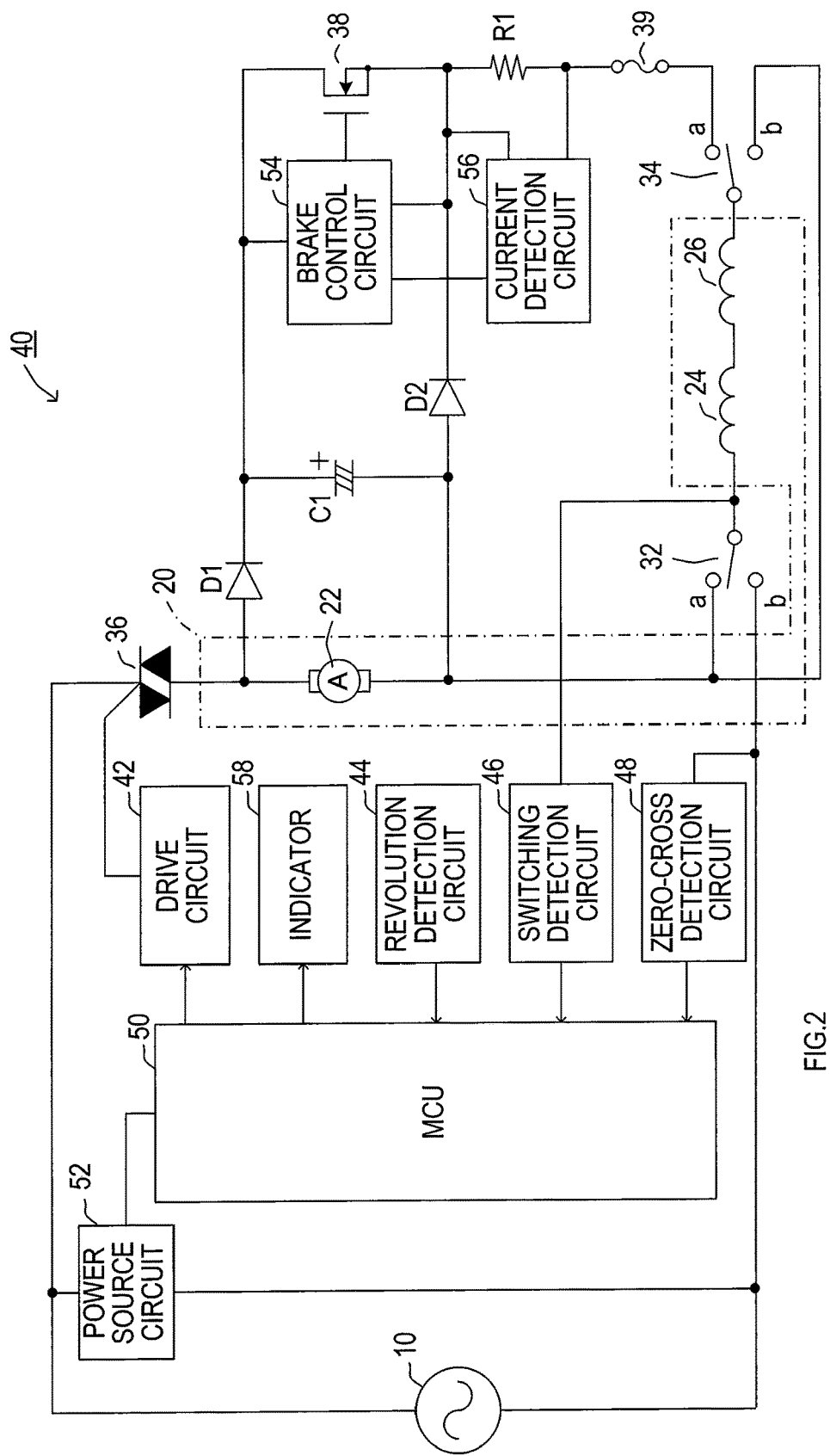
FIG. 2 is a block diagram showing the overall configuration of a drive system of the grinder shown in FIG. 1.

On the lateral wall of the gear housing 6, a hole 7 is formed for externally attaching a grip that is held in a user's hand. A rear cover 8 is disposed in the opposite side of the gear housing 6 of the motor housing 4. From the rear end, which is in the opposite side of the gear housing 6, a power cord 9 is drawn out to receive power supply from a commercial power source, which is an alternating current (AC) power source 10 (see FIG. 2).

The power cord 9 comprises, at the distal end thereof, a power plug that can be connected to an electric outlet of the AC power source 10 and is configured to supply AC power from the AC power source 10 to the grinder 2 when the power plug is inserted into the electric outlet.

Inside the rear cover 8, a controller 40 (see FIG. 2) is housed to perform drive control of the motor 20 with the AC power supplied from the AC power source 10. On the lateral wall of the motor housing 4, an operation switch 30 is disposed to complete or interrupt the electric conduction path for supplying electric power from the AC power source 10 to the motor 20.

The motor 20 is a commutator motor (so-called brushed motor) having a mechanical commutator and a brush to switch electric current flowing through an armature in accordance with the rotational phase and to maintain the rotational moment in a specific direction. In the present embodiment, a single-phase series-wound commutator motor (so-called universal motor) is used.

The controller 40 comprises a pair of drive switches 32, 34, each of the switches 32, 34 being disposed on the opposite sides of the connecting point of a pair of field windings (so-called field coils) 24, 26 (that is, at both ends of the pair of field windings 24, 26) of the motor 20.

The pair of the drive switches 32, 34 is operated in association with the operation of the operation switch 30. When the operation switch 30 is in the off-state, the drive switches 32, 34 are each switched to a contact point "a", and when the operation switch 30 is in the on-state, the drive switches 32, 34 are each switched to a contact point "b".

When the operation switch 30 is in the on-state, in which the drive switches 32, 34 are switched to the contact points "b", the field winding 24 is connected to one end of the AC power source 10 via the drive switch 32, and the field winding 26 is connected to the armature 22 via the drive switch 34.

The armature 22 includes a commutator in the present embodiment. One end of the armature 22, on the opposite side of the field windings 26, is connected to the other end of AC power source 10 via a bidirectional thyristor 36.

Accordingly, when the drive switches 32, 34 are switched to the contact points "b" (drive position), a drive current path of the motor 20 is formed that includes the AC power source 10, the bidirectional thyristor 36, the armature 22, and the field windings 26, 24. When the bidirectional thyristor 36 is in the on-state, drive current flows through the armature 22 and the field windings 26, 24, and the motor 20 is rotated in one direction.

The bidirectional thyristor 36 is a known thyristor configured with an electric current drive type semiconductor device, and used, in the present embodiment, to control conduction current (driving current) to the motor 20 when the operation switch 30 is in the on-state.

On the other hand, when the operation switch 30 is in the off-state and the drive switches 32, 34 are switched to the contact points "a" (brake position), the field windings 24, 26 are connected to the armature 22 in a direction opposite to the direction when the motor 20 is driven.

In other words, to one end of the armature 22, connected to the AC power source 10, the field winding 26 is connected via the drive switch 34. To the other end of the armature 22, where the field winding 26 is connected when the motor 20 is driven, the field winding 24 is connected via the drive switch 32.

On the path connecting one end of the armature 22 to the contact point "a" of the drive switch 34, a diode D1, an FET 38 (field effect transistor), a resistor R1, and a fuse 39 are disposed in this order from the side of the armature 22.

The diode D1 is provided to run brake current from the armature 22 toward the drive switch 34. The FET 38 is provided to complete and interrupt the current path. Moreover, the resistor R1 for current detection is provided to detect the brake current flowing through the current path. The fuse 39 is provided to fuse and disconnect the current path when electric current equal to or larger than a specified value flows in the current path.

Moreover, the current path between the diode D1 and the FET 38 is connected to the other end of the armature 22 via a capacitor C1 for charge accumulation. The other end of the armature 22 is also connected to the current path between the FET 38 and the resistor R1 for current detection via a diode D2.

The anode of the diode D2 is directly connected to the other end of the armature 22 (in other words, the contact point "a" of the drive switch 32), while the cathode is directly connected to the current path between the FET 38 and the resistor R1 for electric current detection.

Between the current path extending between the diode D1 and the FET 38 and the current path extending between the diode D2 and from the resistor R1 to the FET 38, a brake control circuit 54 is connected to drive and control the FET 38 upon receiving power supply from each of the above-described current paths.

To the brake control circuit 54, a current detection circuit 56 is connected to detect electric current from the voltage at both ends of the resistor R1 and to output a detection signal to the brake control circuit 54.

The brake control circuit 54 detects brake current flowing in the field windings 24, 26 via the current detection circuit 56 when the drive switches 32, 34 are in the brake position, that is, to the contact point "a", and switches the on-off-state of the FET 38 such that the value of the electric current becomes a desired value.

Consequently, when the operation switch 30 is switched from the on-state to the off-state, a brake current flows in the motor 20 and the value of the current is controlled via the brake control circuit 54. The control operation of the brake control circuit 54 is described in detail in U.S. Pat. No. 8,766,569, the disclosure of which is incorporated herein by reference.

The controller 40 comprises a drive circuit 42, configured to drive the bidirectional thyristor 36, a revolution detection circuit 44, configured to detect the number of revolutions of the motor 20 (specifically, rotational speed), a switching detection circuit 46, and a zero-cross detection circuit 48.

The switching detection circuit 46 is provided to detect the on-state of the operation switch 30 and configured to detect that the operation switch 30 is switched to the on-state from a voltage change at a connecting portion between the drive switch 32 and the field winding 24.

The zero-cross detection circuit 48 is provided to detect zero-cross points of the AC voltage supplied from the AC power source 10 and is configured to be connected to the electric conduction path between the contact point "b" of the drive switch 32 and the AC power source 10 to detect the zero-cross points from a voltage change in the path.

The drive circuit 42, the revolution detection circuit 44, the switching detection circuit 46, and the zero-cross detection circuit 48 are connected to a MCU (that is, Micro Control Unit) 50. The MCU 50 is a known control unit comprising a CPU, a ROM, and a RAM and is operated upon receiving drive voltage (direct current (DC) constant voltage) from a power source circuit 52.

The power source circuit 52 generates drive voltage (DC constant voltage) from AC power supplied from the AC power source 10 and supplies the drive voltage to the internal circuits of the controller 40 including the MCU 50. Thus, the controller 40 is operated upon receiving power supply from the AC power source 10 even when the operation switch 30 is in the off-state. To the MCU 50, an indicator (such as LEDs) 58 is also connected to indicate the state of the grinder 2.

When the operation switch 30 is in the on-state, the MCU 50 controls motor current by adjusting the time from when a zero-cross point is detected by the zero-cross detection circuit 48 until when the bidirectional thyristor 36 is switched on in accordance with a specified driving speed.

Moreover, when the operation switch 30 is switched from the on-state to the off-state, the MCU 50 operates the brake control circuit 54 to generate braking force for the motor 20 until the rotation of the motor 20 stops.

While the braking force is generated for the motor 20, the MCU 50 monitors the deceleration state (deceleration) of the motor 20 based on the output from the revolution detection circuit 44 and determines a malfunction of the brake system if the deceleration of the motor 20 falls out of a tolerance range.

Figure 3:
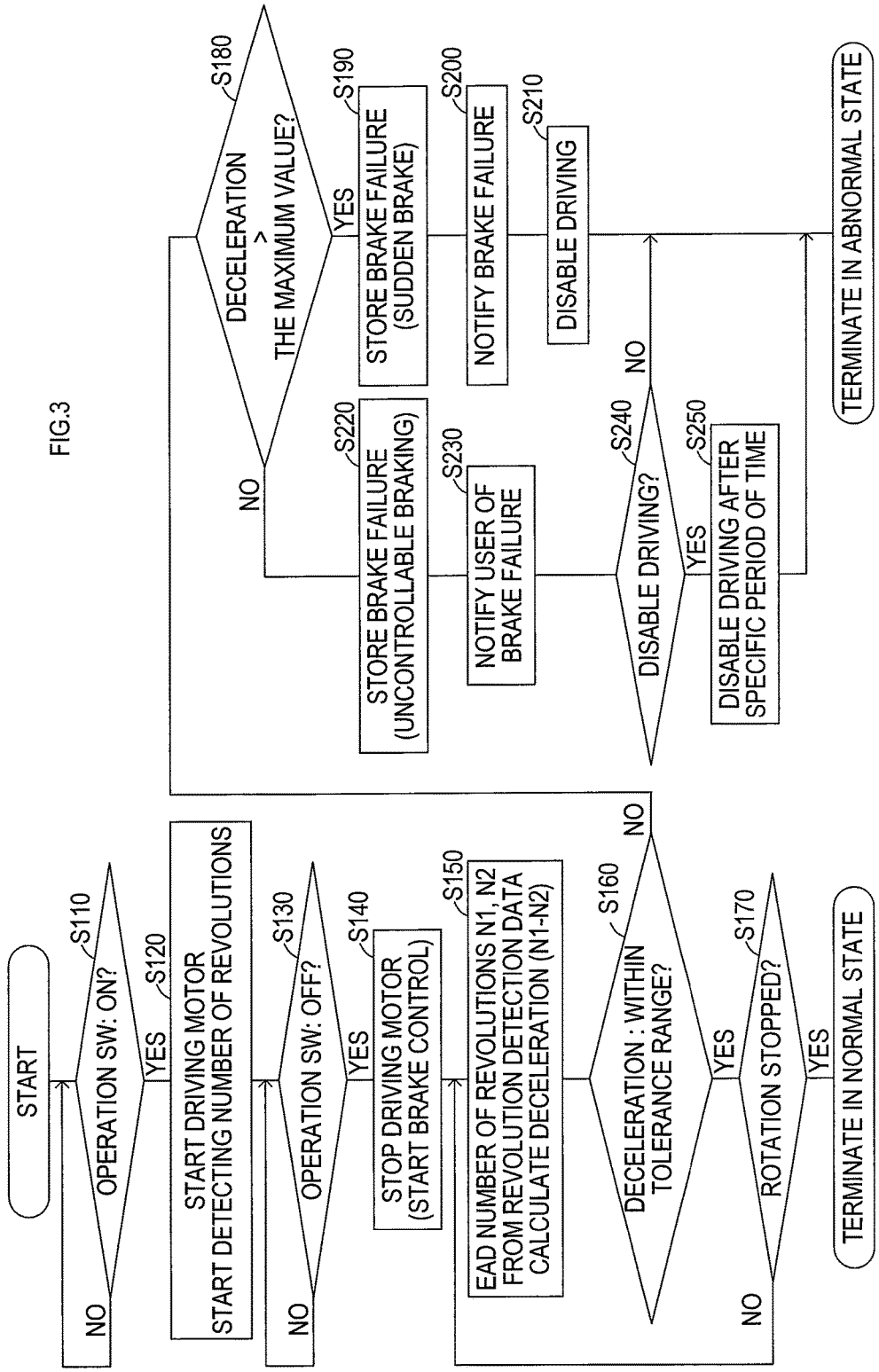
FIG. 3 is a flowchart illustrating a failure determination process executed by a MCU shown in FIG. 2.

The following describes the control process executed in the MCU 50 in accordance with the flowchart shown in FIG. 3.

As shown in FIG. 3, in S110, the MCU 50 determines whether the operation switch 30 is in the on-state and waits for the operation switch 30 to be switched into the on-state. When the operation switch 30 is determined to be in the on-state in S110, the process proceeds to S120. In S120, the drive circuit 42 is controlled to drive the bidirectional thyristor 36 to start driving the motor 20 and detecting the number of revolutions by the revolution detection circuit 44.

Figure 4:
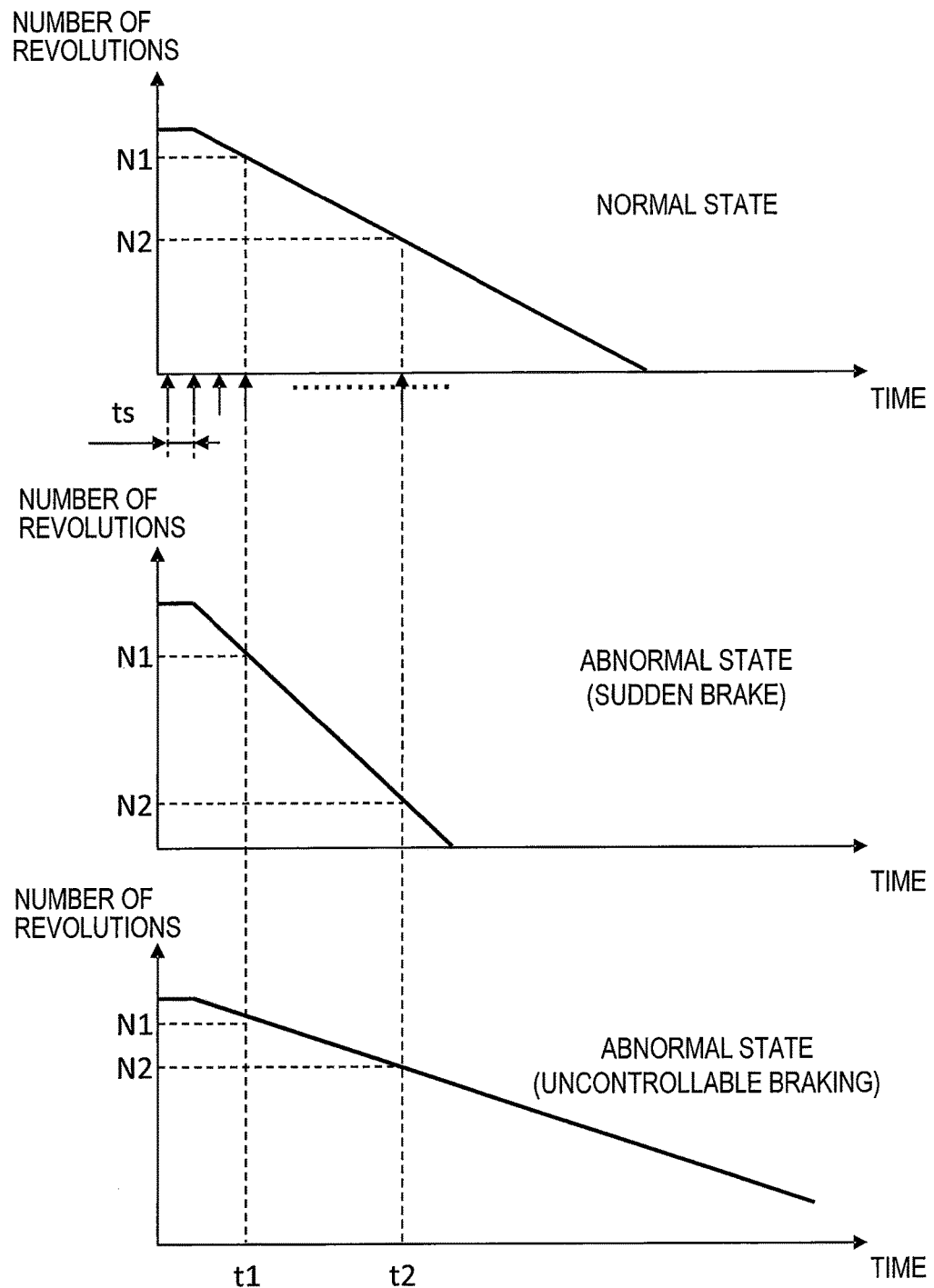
FIG. 4 is a time chart illustrating deceleration and failure determination operations used for failure determination.

The number of revolutions is detected, as shown in FIG. 4, by periodically sampling the number of revolutions of the motor 20 (specifically, rotational speed) N detected by the revolution detection circuit 44 at every specific sampling time is and by storing the sampling results for the past specific period of time in the RAM.

Once the driving of the motor 20 and the detecting of the rotation of the motor 20 are initiated in S120, the process proceeds to S130 wherein the MCU 50 determines whether the operation switch 30 is switched into the off-state and waits until the operation switch 30 is switched into the off-state.

When it is determined in S130 that the operation switch 30 is in the off-state, the process proceeds to S140 wherein the drive circuit 42 is controlled to stop (finish) the driving of the motor 20, that is, to stop supplying driving current from the drive circuit 42 to the motor 20, and the brake control circuit 54 is controlled to initiate brake control.

In S150, from the revolution detection data of the motor 20 obtained from the sampling initiated in S120, the most recent number of revolutions N2 and the number of revolutions N1 sampled a specified period of time before are read, and the difference (N1-N2) is calculated as the deceleration of the motor 20.

In S160, it is determined whether the deceleration (N1-N2) calculated in S150 is within the tolerance range defined by the specified maximum and minimum values. As shown in the upper portion of FIG. 4, when the deceleration (N1-N2) is determined to be within the tolerance range, it is determined that the brake control is performed in a normal state. Then, the process proceeds to S170.

In S170, it is determined, from the most recent number of revolutions N2 of the motor 20, whether the rotation of the motor 20 has stopped. If it is determined that the rotation of the motor 20 has stopped, it is determined that the motor 20 has been normally driven and stopped, and the control process is terminated in a normal state. When the process is terminated, the process goes back to S110, and the MCU 50 waits for the operation switch 30 to be operated again. Although the upper portion of FIG. 4 may seem to show that the time interval between time t1 for sampling the number of revolutions N1 and time t2 for sampling the number of revolutions N2 is six cycles of the sampling cycles ts, the interval between t1 and t2 may be set for a suitable length. For example, t2 may be defined to be at one sampling cycle after t1.

In S170, it is determined that the rotation of the motor 20 has not stopped (in other words, the motor 20 is decelerating), the process goes back to S150 wherein the deceleration of the motor 20 is calculated. Then, in S160, it is determined whether the deceleration is within the tolerance range.

In S160, if it is determined that the deceleration of the motor 20 is not within the tolerance range, the process proceeds to S180 wherein, as shown in the middle portion in FIG. 4, it is determined whether the deceleration (N1-N2) exceeds the maximum value.

If it is determined that the deceleration of the motor 20 exceeds the maximum value, the process proceeds to S190. In S190, it is determined that sudden brake has been applied to the motor 20 due to brake failure of the motor 20 and the determination is stored.

The brake failure may be stored in S190 and S220, which will be described later, only temporarily in the RAM of the MCU 50, or may be stored in a nonvolatile memory of the ROM in the MCU 50 so that the failure history can be checked later.

As described above, when a brake failure (sudden brake) is detected in S190, the process proceeds to S200 wherein the brake failure is notified by indicating the brake failure on the indicator 58. In S210, further driving of the motor 20 is disabled and then the control process is terminated in an abnormal state.

After the process is terminated in an abnormal state, since the driving of the motor 20 is disabled, power supply at least to the MCU 50 is stopped until the MCU 50 is restarted. Thus, the control process is not performed even if a user operates the operation switch 30, and the stopped state of the motor 20 is maintained.

In S180, if it is determined that the deceleration of the motor 20 does not exceed the maximum value, in other words, the deceleration (N1-N2) falls below the minimum value as shown in the lower portion in FIG. 4, the process proceeds to S220.

In S220, it is determined that, due to the brake failure of the motor 20, the motor 20 is uncontrollable, and such determination is stored. When brake failure (uncontrollable braking) is detected in S220 as described above, the process proceeds to S230 wherein the brake failure is shown on the indicator 58 and the user is notified of the brake failure. In S240, it is determined whether the driving of the motor 20 is disabled.

In S240, if it is determined that the driving the motor 20 is not disabled, the control process is terminated. On the other hand, if it is determined in S240 that the driving of the motor 20 is disabled, a timer is set to disable the driving of the motor 20 when a specific period of time passes after the brake failure is currently detected, and the control process is terminated.

As described above, in the present embodiment, when brake failure (uncontrollable braking) is detected in S220, the control process is terminated either after the brake failure (uncontrollable braking) is notified, or after the timer is set to the timing to disable the driving of the motor 20.

This is because, even if brake failure (uncontrollable braking) takes place, the motor 20 can still be driven via the bidirectional thyristor 36 and the drive circuit 42, serving as the drive device, and the rotation of the motor 20 can be stopped by stopping the driving of the motor 20.

In other words, if brake failure (uncontrollable braking) takes place, the user is notified of the failure in the present embodiment. The user can be aware that braking force cannot be generated when the driving of the motor 20 is stopped and it would take time until the motor 20 stops. Since the user can rotate the motor 20 while being aware of such state, the user can continue to work with the grinder 2 in consideration of safety.

Moreover, in the present embodiment, by establishing the setting to disable the driving the motor 20 after a specific period of time, the driving of the motor 20 after the work with the grinder 2 finishes can be disabled. Consequently, a user who is unaware of brake failure can be inhibited from using the grinder 2.

On the other hand, if brake failure takes place and sudden brake is applied to the motor 20, the driving of the motor 20 is immediately disabled in addition to the user being notified of the brake failure. This is because, if the motor 20 suddenly is decelerated, the spindle 12 is also suddenly decelerated, which may cause loosening of the tool bit 16 fastened by the locknut 18.

In other words, in the present embodiment, when sudden brake is applied to the motor 20 due to brake failure, the driving of the motor 20 after the sudden brake is disabled so that the motor 20 is inhibited from being driven while the fastening of the tool bit 16 by the locknut 18 is loosened.

As described above, according to the grinder 2 of the present embodiment, when an abnormality takes place in the FET 38, the brake control circuit 54, or the circuits around these devices, which serve as the brake device, brake failure can be detected, the user informed, and, if necessary, the driving of the motor 20 can be disabled. Therefore, according to the present embodiment, the grinder 2 can be inhibited from being unavailable due to brake failure and safety in using the grinder 2 can be improved.

In the present embodiment, the processes in S150 to S250 in the control process executed by the MCU 50 are one example of the failure determiner of the present disclosure.

Although the above has described one embodiment of the present disclosure, the present disclosure is not limited to the above-described embodiment, but may be carried out in various ways.

For example, in the above-described embodiment, the motor 20 is configured with a single-phase series-wound commutator motor, and the controller 40 is configured to control driving of the motor 20 upon receiving power supply from the AC power source 10.

Figure 5:
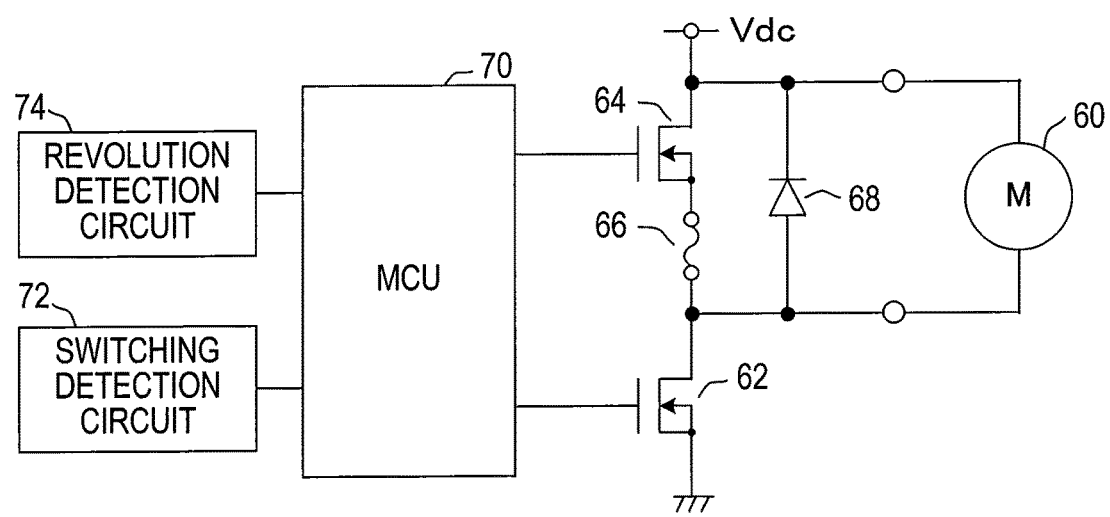
FIG. 5 is a block diagram showing the configuration of a direct-current driven type drive system of an electric working machine.

However, the technique of the present disclosure can be applied in a similar manner as in the above-described embodiment to, for example an electric working machine, as shown in FIG. 5, that comprises a brushed DC motor (to be referred to as a motor 60) and is configured to drive the motor 60 at DC power voltage Vdc supplied from a DC power source, such as a battery.

That is, as shown in FIG. 5, a switching element 62, serving as the drive device, is serially coupled to the motor 60. When a switching detection circuit 72 detects that an operation switch (not shown) is switched on, a MCU 70 switches on the switching element 62 to run drive current through the motor 60 and to rotate the motor 60 in one direction.

Moreover, a series circuit, having a switching element 64 and a fuse 66 serving as the brake device, and a diode (so-called flywheel diode) 68 for reflux are coupled to the motor 60 in parallel. When a switching detection circuit 72 detects that the operation switch is switched from the on-state to the off-state, a MCU 70 switches off the switching element 62 and switches on the switching element 64. As a result, brake current runs into the motor 60 and braking force is generated.

The electric working machine configured as above can also achieve the same effect as in the above-described embodiment if the configuration is such that a detection signal, outputted from the revolution detection circuit 74 that detects the number of revolutions of the motor 60, is input into the MCU 70 and the control process shown in FIG. 3 is executed by the MCU 70.

On the other hand, in the above-described embodiment, the number of revolutions of the motor 20 is sampled and the deceleration of the motor 20 is obtained from the difference between the most recent sampling value (the number of revolutions N2) and the sampling value (the number of revolutions N1) obtained a specified period of time before.

However, the deceleration of the motor 20 may be, for example, calculated from the number of revolutions of the spindle 12, or the deceleration may be detected with, for example, an acceleration speed sensor. In other words, the deceleration of the motor 20 may be obtained with various conventionally-known techniques.

Furthermore, in the above-described embodiment, brake failure is determined when deceleration of the motor 20 falls outside the tolerance range defined by the maximum and the minimum values. Brake failure may be determined only when the deceleration exceeds the maximum value. Alternatively, brake failure may be determined only when the deceleration falls below the minimum value. When brake failure is determined, the brake failure may be only brought to the user's attention, or the driving of the motor 20 may be simply stopped.

Moreover, in the above-described embodiment, brake function of the motor 20 is achieved by running brake current to the motor windings and generating braking force in the motor 20. The configuration may be such that the brake function is achieved by providing a motor with windings for braking. Alternatively, the configuration may be such that brake function is achieved by a brake device that applies braking force directly to the rotational shaft of a motor.

Still furthermore, in the above-described embodiment, the grinder 2 is provided as one example of the electric working machine. The electric working machine according to the present disclosure may be any type of electric working machine that has brake function to generate braking force when the motor, serving as a power source, is stopped. An example of the electric working machine includes electric power tools for stone work, electric power tools for metal work, electric power tools for woodwork, and electric power tools for gardening.

More specifically, the present disclosure may be applied to various electric working machines including electric hammers, electric hammer drills, electric drills, electric drivers, electric wrenches, electric circular saws, electric reciprocating saws, electric jigsaws, electric hammers, electric cutters, electric chain saws, electric planes, electric nailguns (including reveting machines), electric hedge trimmers, electric lawn mowers, electric lawn clippers, electric trimmers, electric cleaners, and electric blowers.

A plurality of functions possessed by one component in the above-described embodiment may be achieved by a plurality of components, or one function possessed by one component may be achieved by a plurality of components. Furthermore, a plurality of functions possessed by a plurality of components may be achieved by one component, or one function achieved by a plurality of components may be achieved by one component. Moreover, the configuration of the above-described embodiment may be partially omitted. At least a part of the configuration of the above-described embodiment may be added to or altered with the configurations of other embodiments. Various aspects included in the technical ideas specified by the expressions used in the claims correspond to the embodiments of the present disclosure.

Still furthermore, the technique according to the present disclosure can be achieved by, in addition to the electric working machine, various ways including a system comprising the electric working machine as a component, a program for a computer to function as the electric working machine, a recording medium, such as a semiconductor memory, having this program recorded therein, or a method for controlling an electric working machine.

What is claimed is:

1. An electric working machine, comprising:
a motor;
a switch configured for operation by a user, the switch having an on-state and an off-state;
a drive device configured to drive the motor in response to the switch being placed in the on-state;
a brake device configured to control deceleration of the motor to a stopped state in response to the switch being placed in the off-state; and
a failure determiner configured to monitor deceleration of the motor during controlled deceleration and to determine whether the brake device has failed based on the monitored deceleration.

2. The electric working machine according to claim 1, wherein the failure determiner is further configured to determine whether the brake device has failed based on whether the monitored deceleration falls outside a specified range of values.

3. The electric working machine according to claim 1, wherein the failure determiner is further configured to notify the user whether the brake device has failed.

4. The electric working machine according to claim 1, wherein the failure determiner is further configured to notify the user in the event the failure determiner determines that the brake device has failed.

5. An electric working machine comprising:
a motor;
a drive device configured to drive the motor;
a brake device configured to generate braking force to stop rotation of the motor when driving of the motor by the drive device is finished; and
a failure determiner configured to detect deceleration of the motor when the driving of the motor by the drive device is stopped and to determine whether the brake device has failed based on the deceleration.

6. The electric working machine according to claim 5, wherein the failure determiner is configured to determine that the brake device has failed when the deceleration of the motor exceeds a specified maximum value.

7. The electric working machine according to claim 5, wherein the failure determiner is configured to determine that the brake device has failed when the deceleration of the motor falls below a specified minimum value.

8. The electric working machine according to claim 5, wherein the failure determiner is configured to notify a user of failure of the brake device when the brake device is determined to have failed.

9. The electric working machine according to claim 5, wherein the failure determiner is configured to disable the drive device not to drive the motor when brake device is determined to have failed.

10. The electric working machine according to claim 5, wherein the failure determiner is configured to allow the drive device to drive the motor for a specific period of time when the brake device is determined to have failed, and disable the drive device not to drive the motor after the specific period of time passes.

11. The electric working machine according to claim 5, wherein the failure determiner is configured to sample number of revolutions of the motor at specific intervals and to detect the deceleration of the motor based on a difference between a most recent sampling result and a sampling result a specified period of time before.

12. A method for operating an electric working machine having a motor and a switch configured for operation by a user, the switch having an on-state and an off-state, the method comprising:
   driving the motor in response to the switch being placed in the on-state;
   controlling deceleration of the motor to a stopped state in response to the switch being placed in the off-state;
   monitoring deceleration of the motor during controlled deceleration; and
   determining whether the brake device has failed based on the monitored deceleration.

13. The method according to claim 12, wherein determining whether the brake device has failed is based on whether the monitored deceleration exceeds a maximum value.

14. The method according to claim 12, wherein determining whether the brake device has failed is based on whether the monitored deceleration is below a minimum value.

15. The method according to claim 12, wherein determining whether the brake device has failed is based on whether the monitored deceleration falls outside a predetermined range of values.

16. The method according to claim 12, further comprising notifying the user whether the brake device has failed.

17. The method according to claim 12, further comprising notifying the user in the event that the brake device has failed.

18. The method according to claim 12, further comprising disabling the motor in the event that the brake device has failed.

19. The method according to claim 12, further comprising disabling the motor after a pre-determined period of time, in the event that the brake device has failed.

20. The method according to claim 12, further comprising:
   sampling the number of rotations of the motor at periodic intervals; and
   monitoring deceleration based on the sampled numbers of rotations for the periodic intervals that are the most-recent and second most-recent intervals.

* * * * *